(12) United States Patent
Gupta

(10) Patent No.: US 11,403,621 B2
(45) Date of Patent: Aug. 2, 2022

(54) DATA COORDINATION WITH A MOBILE WALLET APPLICATION

(71) Applicant: The Western Union Company, Englewood, CO (US)

(72) Inventor: Abhinav Gupta, San Francisco, CA (US)

(73) Assignee: The Western Union Company, Denver, CO (US)

(*) Notice: Subject to any disclaimer, the term of this patent is extended or adjusted under 35 U.S.C. 154(b) by 598 days.

(21) Appl. No.: 15/448,957

(22) Filed: Mar. 3, 2017

(65) Prior Publication Data

US 2018/0253721 A1    Sep. 6, 2018

(51) Int. Cl.
*G06Q 20/36* (2012.01)
*G06Q 20/32* (2012.01)

(52) U.S. Cl.
CPC ......... *G06Q 20/36* (2013.01); *G06Q 20/3223* (2013.01)

(58) Field of Classification Search
CPC ........................... G06Q 20/36; G06Q 20/3223
USPC ........................................................... 705/39
See application file for complete search history.

(56) References Cited

U.S. PATENT DOCUMENTS

| | | | | |
|---|---|---|---|---|
| 5,960,411 A * | 9/1999 | Hartman | ............... | G06Q 10/087 705/26.8 |
| 8,666,837 B2 * | 3/2014 | Urbanski | ............... | G06Q 50/16 705/26.1 |
| 10,387,862 B2 * | 8/2019 | Laracey | ............... | G06Q 20/405 |
| 10,853,791 B1 * | 12/2020 | Ellis | ................... | G06Q 20/405 |
| 2013/0346302 A1 * | 12/2013 | Purves | ................. | G06Q 20/108 705/40 |
| 2014/0006129 A1 * | 1/2014 | Heath | ................ | G06Q 30/0222 705/14.23 |
| 2015/0348002 A1 * | 12/2015 | Van Os | ................... | G06Q 20/10 705/44 |
| 2016/0239818 A1 * | 8/2016 | Laracey | ............. | G06Q 20/4014 |

OTHER PUBLICATIONS

Developing a Mobile App for Monitoring Medical Record Changes Using Blockchain: Development and Usability Study (Year: 2020).*
Extending an e-Government Service Measurement Framework to m-Governement Services (Year: 2017).*

* cited by examiner

*Primary Examiner* — Bruce I Ebersman
(74) *Attorney, Agent, or Firm* — Kilpatrick Townsend & Stockton LLP

(57) ABSTRACT

A method for coordinating data with a mobile wallet application on a mobile device is provided. The method may include receiving an instruction to add a digital card to a digital wallet, where the instruction includes an identifier of a transaction between a sending entity and a receiving entity facilitated by an intermediate entity. The method may also include receiving from the intermediate entity, status information associated with the digital card, which includes information associated with the transaction. The method may further include providing at least a portion of the status information to a secondary application. The method may additionally include receiving a selection of the digital card. The method may moreover include causing a tertiary application to execute based at least in part on the selection. The method may furthermore include sending to the tertiary application the identifier or at least some portion of the status information.

12 Claims, 3 Drawing Sheets

DATA COORDINATION WITH A MOBILE WALLET APPLICATION

BRIEF DESCRIPTION OF THE INVENTION

In one embodiment, a method for coordinating data with a mobile wallet application on a mobile device is provided. The method may include receiving, with a mobile wallet application on a mobile device, an instruction to add a digital card to a digital wallet, where the instruction includes an identifier of a first transaction between a sending entity and a receiving entity facilitated by an intermediate entity. The method may also include receiving, with the mobile wallet application, from the intermediate entity, status information associated with the digital card, where the status information includes information associated with the first transaction. The method may further include providing, from the mobile wallet application, at least a portion of the status information to a secondary application. The method may additionally include receiving, with the mobile wallet application, a selection of the digital card. The method may moreover include causing, with the mobile wallet application, a tertiary application to execute based at least in part on the selection by the user of the digital card. The method may furthermore include sending, from the mobile wallet application, to the tertiary application, the identifier or at least some portion of the status information.

In another embodiment, a system for coordinating data with a mobile wallet application is provided. The system may include a processor configured to perform a method. The method may include receiving an instruction to add a digital card to a digital wallet, where the instruction includes an identifier of a first transaction between a sending entity and a receiving entity facilitated by an intermediate entity. The method may also include receiving from the intermediate entity, status information associated with the digital card, where the status information includes information associated with the first transaction. The method may further include providing at least a portion of the status information to a secondary application. The method may additionally include receiving a selection of the digital card. The method may moreover include causing a tertiary application to execute based at least in part on the selection by the user of the digital card. The method may furthermore include sending, to the tertiary application, the identifier or at least some portion of the status information.

In another embodiment, a non-transitory machine readable medium having instructions stored thereon for coordinating data with a mobile wallet application is provided. The instructions may be executable by one or more processors to perform a method. The method may include receiving an instruction to add a digital card to a digital wallet, where the instruction includes an identifier of a first transaction between a sending entity and a receiving entity facilitated by an intermediate entity. The method may also include receiving from the intermediate entity, status information associated with the digital card, where the status information includes information associated with the first transaction. The method may further include providing at least a portion of the status information to a secondary application. The method may additionally include receiving a selection of the digital card. The method may moreover include causing a tertiary application to execute based at least in part on the selection by the user of the digital card. The method may furthermore include sending, to the tertiary application, the identifier or at least some portion of the status information.

BRIEF DESCRIPTION OF THE DRAWINGS

The present invention is described in conjunction with the appended figures.

Figure 1:
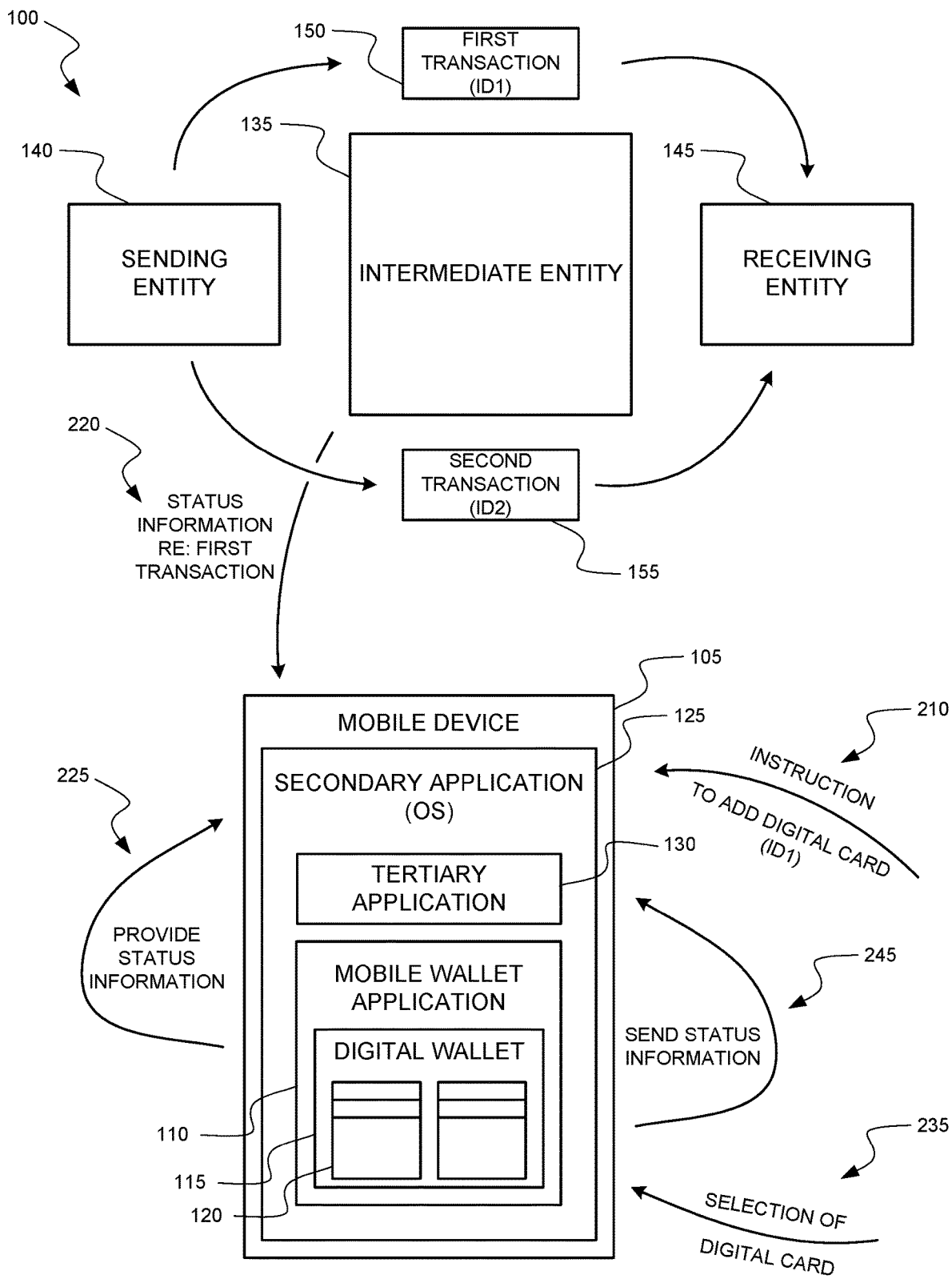
FIG. 1 is diagram of one system embodiment of the invention for coordinating data with a mobile wallet application on a mobile device.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 2:
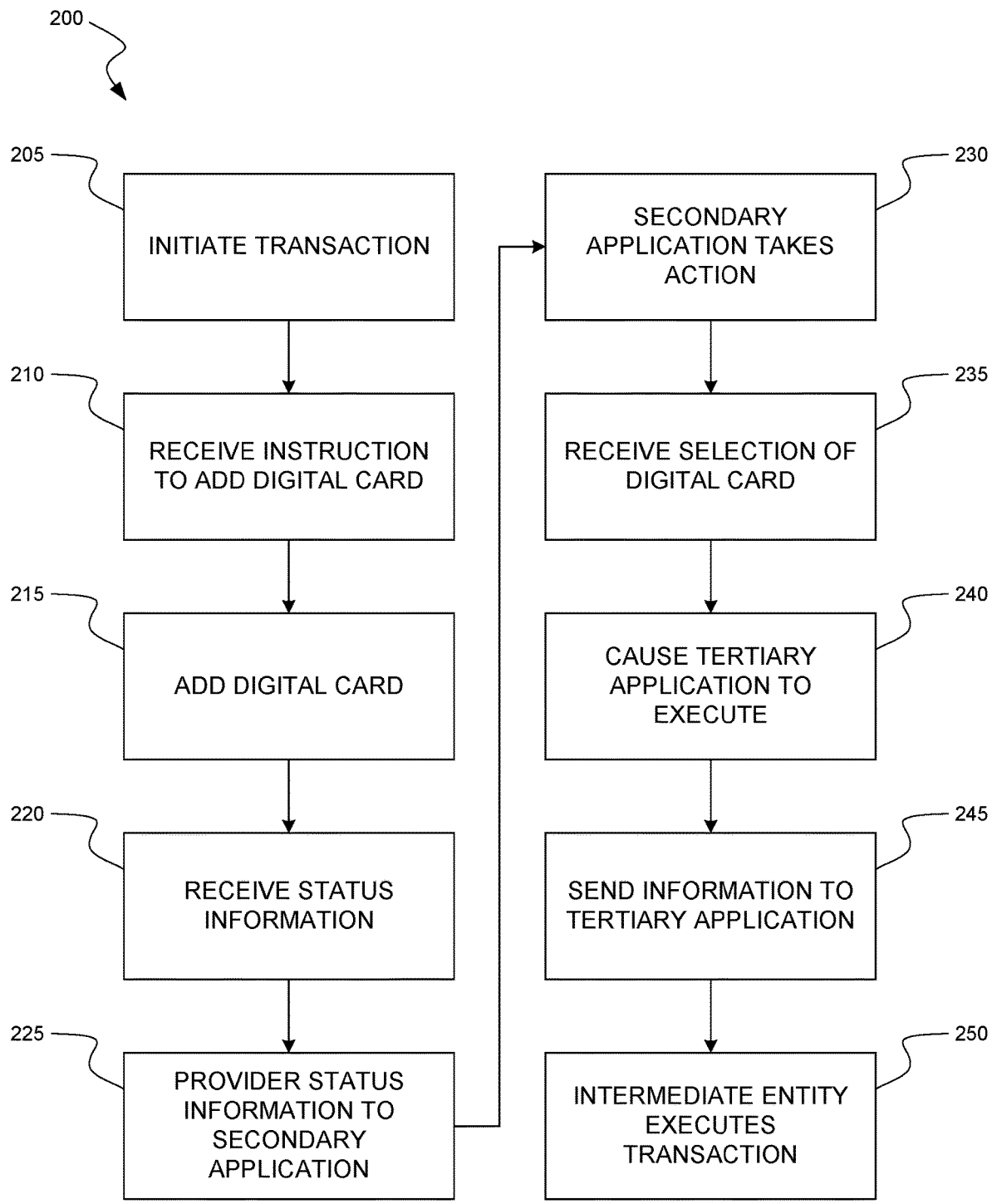
FIG. 2 is a block diagram of one method embodiment of the invention for coordinating data with a mobile wallet application on a mobile device.

Turning now to FIG. 1 and FIG. 2, one possible system 100 capable of implementing one possible method 200 of the invention is shown.

System 100 may include a mobile device 105 having a mobile wallet application 110 operating thereon. Mobile device may 105 be any portable electronic device which is capable of implementing embodiments of the invention discussed herein. In some embodiments mobile device 105 may be a mobile phone such a cellular or smart phone, a tablet computing device such as an iPad™ or Microsoft Surface™, a wearable computing device, a notebook or laptop computing device, and or other similarly equipped device.

Mobile wallet application 110 may execute on mobile device 105 to a provide a digital wallet 115 which includes one or more digital cards 120. Digital wallet 115 may provide a digital location for the storage of digital cards 120 which are representative of real world financial instruments and other various cards typically carried by consumers such as program loyalty cards and/or membership cards. Digital wallet 115 may allow for electronic or direct point-of-sale execution of transactions, financial and otherwise, which employ digital cards 120 in a fashion similar to if real world versions of the same were used.

Mobile device 105 may also include a secondary application 125 such as an operating system, as well as a tertiary application 130. Secondary application 125 may be the operating system which is the environment in which tertiary application 130 executes. Tertiary application 130 may be any application, but in some embodiments it may be an application distributed for users of services of an intermediate entity 135, which allows the users to avail themselves of those services.

Merely by way of example, intermediate entity 135 may be a money transfer or other financial service. In at least examples where intermediate entity 135 is a money transfer service, intermediate entity 135 may facilitate and/or conduct transactions between a sending entity 140 and a receiving entity 145.

Consequently, in some embodiments, sending entity 140 may wish to conduct a transaction with receiving entity 145, for example, a money transfer. At block 205, sending entity 140 may, in-person at a location provided by intermediate entity 135, with tertiary application 130 as provided by intermediate entity 135, or via a web browser (on mobile device 105 or otherwise) may cause a first transaction 150 to be initiated. Other possible means of initiation may also be possible. During or after first transaction 150 is initiated, an instruction to add a digital card 120 representative of first transaction 150 and/or intermediate entity 135 is sent to mobile wallet application 110 of mobile device 105, and received at block 210.

The instruction may include an identifier of first transaction 150, and/or any other information pertaining to first transaction 150, intermediate entity 135, sending entity 140's account or relationship with intermediate entity 135, receiving entity 145, and/or receiving entity 145's account or relationship with intermediate entity 135. The identifier of first transaction 150 (shown as ID1 in FIG. 1), may be any identifier useful for associating with, and referencing first transaction 150. For example, the identity may be a money transfer control number (MTCN). Merely by way of example, other information which may be included in the instruction include an amount of first transaction 150, identity information of sending entity 140, identity information of receiving entity 145, and/or any other pertinent information.

Note that the instruction to add the digital card 120 may be sent to any number of wallets on any number of various devices based on the information pertaining to the first transaction included in the instruction. For example, the sending entity's mobile device may receive an instruction to add a digital card 120 based on an identification of the sending entity in the instruction. Likewise, the receiving entity's mobile device could also or alternatively receive an instruction to add a digital card 120 based on an identification of the receiving entity in the instruction. Thus, a digital card 120 can be added for any party associated with the transaction.

As also described herein, such digital cards 120 can be created or maintained by the mobile wallet applications and the systems herein even in the absence of a presently related transaction, perhaps in preparation for the user of the digital card 120 to eventually be associated as a sending or receiving entity for a future transaction. Additionally, a digital card 120 associated with a transaction (possibly at the card's creation) may continue to exist after the transaction has been completed. So while such digital cards 120 may pertain to (1) a user or users and (2) a transaction at one point in time, such digital cards 120 may only more specifically and currently relate to a user or users at another point in time (earlier or later), with perhaps only a historical connection/relationship to previous transactions associated with the digital card 120 stored in associated databases.

At block 215, digital card 120 may be added to digital wallet 115 by mobile wallet application 110. Some or all of the information received with the instruction to add digital card 120 may be stored in association therewith.

At block 220, status information associated with digital card 120 may be received from intermediate entity 135. The status information may update previously received information regarding first transaction 150, and/or provide additional information. The status information may be received via direct communication between intermediate entity 135 and mobile wallet application 110, or may be conducted via tertiary application 130.

At block 225, mobile wallet application 110 may provide at least a portion of the status information to at least some portion of secondary application 125, perhaps in automatic response to receipt of the information. At block 230, secondary application 125 may include a mechanism for taking an action with respect to the information such as displaying updates regarding digital cards 120 of digital wallet 115, and so transmission of the status information (either pushed or pulled (requested) by secondary application 125), may allow secondary application to do so.

For example, secondary application 125 may allow for an alert to be displayed on top of other simultaneous running applications, or in specialized display screens for such purposes (e.g., lock or status screens). In some embodiments, users may be able to interact with these alerts causing a digital card 120 or tertiary application 130 to be executed and information regarding the transaction to be presented.

Either via an alert associated with digital card 120, or via direct interaction with digital card 120 in digital wallet 115, at block 235 a user selection of digital card 120 is received. This may cause tertiary application 130 to execute at block 240. The identifier associated with first transaction 150, and/or any other information associated with digital card 120, may then be sent to tertiary application 130 at block 245.

A user may then interact with tertiary application 130 to modify first transaction 150, and/or cause a second transaction 155 to be executed by intermediate entity. For example, first transaction 150 may be repeated exactly, or in some partially similar manner, as a new transaction via reference to the details associated with first transaction 150. In the above manner then, digital card 120 facilitates interaction with intermediate entity 135 by a user of mobile device 105 for transactions conducted therewith.

Other interactions using the system described herein are also possible in various embodiments of the invention. Additionally, some modifications may also be present depending on the embodiment. For example, in some embodiments, a web browser stored on mobile device 105 may be used to provide the functions of tertiary application 130. By way of further example, the instruction to add a digital card 120 may be received from a web browser accessing a site of intermediate entity 135.

In some embodiments, digital card 120 may be transaction specific, while in other embodiments, digital card 120 may be intermediate entity 135 specific. Thus, in the former case, multiple digital cards 120 may be present for each transaction conducted by a user. Hybrid arrangements are also possible, where a digital card 120 may be present and represent the user's account with intermediate entity 135, with additional digital cards 120 provided on a transaction-by-transaction, receiver-by-receiver, or other basis.

In some embodiments, digital cards 120 may also be provided to receiving entities 145 of transactions. This may occur whether or not a particular receiving entity has a tertiary application 130 provided by intermediate entity 135, or not. Delivery of the instruction to put such a card in a wallet could also occur via link in email, short-message-service (SMS), or other means, and could provide receiving entity 145 with awareness and/or updates of incoming transactions. Such recipient digital cards 120 could be used in much the same manner as sending entity 140 digital cards 120 described above. Furthermore, they could provide authentication for completion of transactions involving the receiving entity 145.

Figure 3:
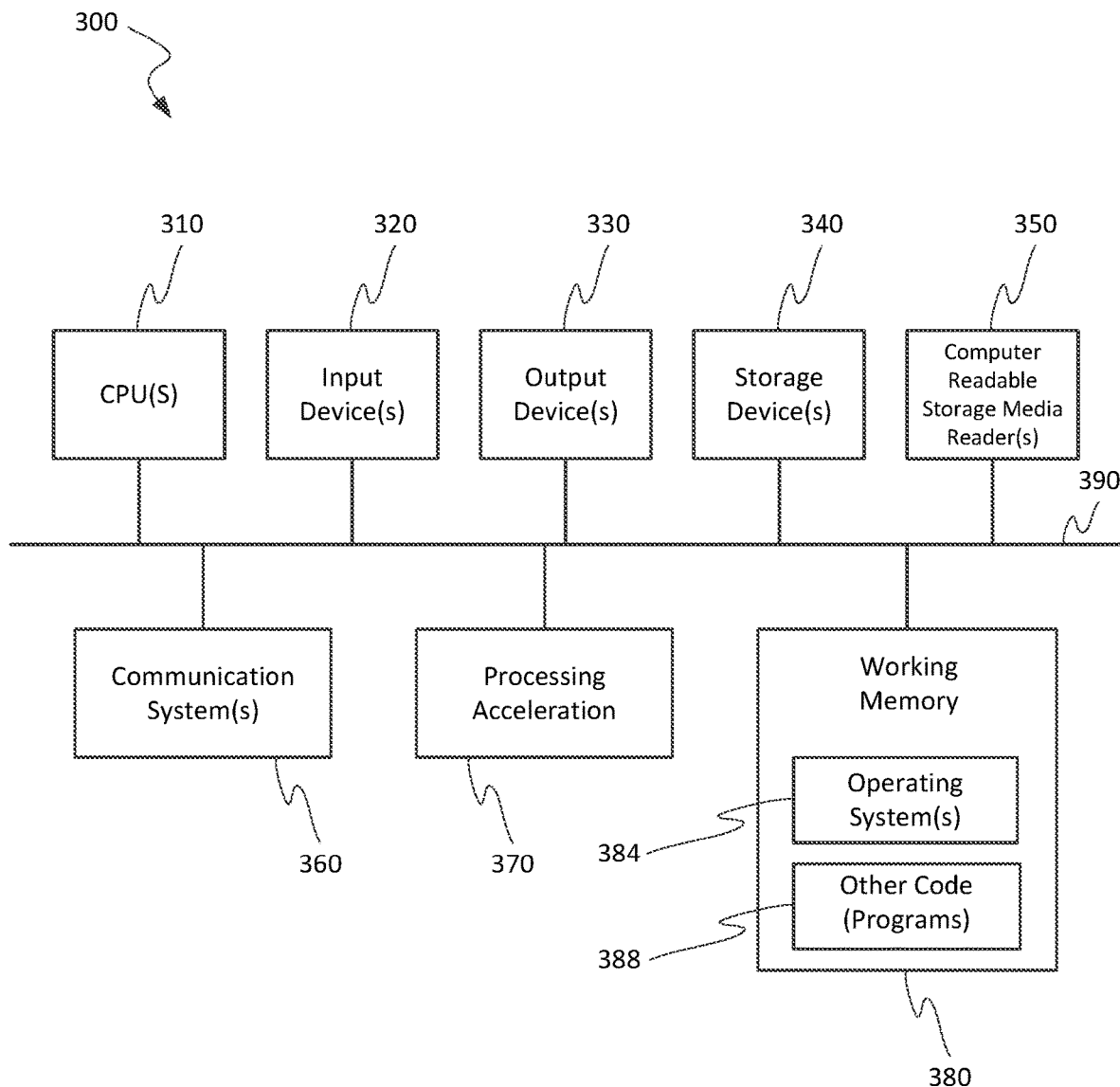
FIG. 3 is a block diagram of an exemplary computer system capable of being used in at least some portion of the apparatuses or systems of the present invention, or implementing at least some portion of the methods of the present invention.

FIG. 3 is a block diagram illustrating an exemplary computer system 300 in which embodiments of the present invention may be implemented. This example illustrates a computer system 300 such as may be used, in whole, in part, or with various modifications, to provide the functions of mobile device 105, mobile wallet application 110, secondary application 125, tertiary application 130, and/or other components of the invention such as those discussed above. For example, various functions of mobile wallet application 110 may be controlled by the computer system 300, including, merely by way of example, receiving instructions to add digital cards 120, providing status information to secondary application 125, etc.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, the computer system 300 may also include a processing acceleration unit 370, which can include a digital signal processor, a special-purpose processor and/or the like.

The computer-readable storage media reader 350 can further be connected to a computer-readable storage medium, together (and, optionally, in combination with storage device(s) 340) comprehensively representing remote, local, fixed, and/or removable storage devices plus storage media for temporarily and/or more permanently containing computer-readable information. The communications system 360 may permit data to be exchanged with a network, system, computer and/or other component described above.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 300 may include code 388 for implementing any or all of the function of the various elements of the architecture as described herein. For example, software, stored on and/or executed by a computer system such as system 300, can provide the functions of mobile device 105, mobile wallet application 110, secondary application 125, tertiary application 130, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for coordinating data with a mobile wallet application on a mobile device, wherein the method comprises:
    generating an identifier based on a first transaction between a sending entity and a receiving entity facilitated by an intermediate entity, wherein the identifier comprises a unique identifier that is specific to the first transaction;
    receiving, by a mobile wallet application on a mobile device from a tertiary application on the mobile device, an instruction comprising the identifier to add a digital card to a digital wallet, where the digital card is mapped to the first transaction between the sending entity and the receiving entity;
    receiving, with the mobile wallet application, from the intermediate entity, status information associated with the digital card, wherein the status information includes information associated with the first transaction including an indication of the sending entity and the receiving entity;
    providing, from the mobile wallet application, at least a portion of the status information to a secondary application;
    causing, with the mobile wallet application, based at least in part on the portion of the status information received by the secondary application, the secondary application to display one or more alerts associated with the digital card, where the one or more alerts correspond to interactive elements that allow user interaction to cause the digital card or a tertiary application to be executed and information regarding the first transaction to be presented;
    receiving, with the mobile wallet application, via a selection of the displayed one or more alerts associated with the digital card, a selection of the digital card;
    consequent to the selection of the displayed one or more alerts, causing, with the mobile wallet application, the tertiary application that corresponds to a mobile application on the mobile device to execute based at least in part on the selection of the digital card, wherein the tertiary application comprises an interface application provided by the intermediate entity; and
    sending, from the mobile wallet application, to the tertiary application, the identifier and the status information so that the tertiary application causes a second transaction between the sending entity and the receiving entity to occur based at least in part on the identifier and the status information, where the second transaction is executed as at least partially as a repeat of the first transaction facilitated by the intermediate entity.

2. The method for coordinating data with a mobile wallet application on a mobile device of claim 1, wherein:
    the providing at least the portion of the status information to the secondary application occurs in response to receipt of the status information.

3. The method for coordinating data with a mobile wallet application on a mobile device of claim 1, wherein:
    the providing at least the portion of the status information to the secondary application occurs in response to a request from the secondary application.

4. The method for coordinating data with a mobile wallet application on a mobile device of claim 1, wherein the secondary application comprises:
    at least some portion of an operating system of the mobile device.

5. A system for coordinating data with a mobile wallet application, the system comprising:
    a processor configured to at least:
        generate an identifier based on a first transaction between a sending entity and a receiving entity facilitated by an intermediate entity, wherein the identifier comprises a unique identifier that is specific to the first transaction;
        receive an instruction comprising the identifier to add a digital card to a digital wallet from a tertiary application, where the digital card is mapped to the first transaction between the sending entity and the receiving entity;
        receive, from the intermediate entity, status information associated with the digital card, wherein the status information includes information associated with the first transaction including an indication of the sending entity and the receiving entity;
        provide at least a portion of the status information to a secondary application;
        cause, based at least in part on the portion of the status information received by the secondary application, the secondary application to display one or more alerts associated with the digital card, where the one or more alerts correspond to interactive elements that allow user interaction to cause the digital card or a tertiary application to be executed and information regarding the first transaction to be presented;
        receive, via a selection of the displayed one or more alerts associated with the digital card, a selection of the digital card;
        consequent to the selection of the displayed one or more alerts, cause the tertiary application that corresponds to a mobile application on a mobile device to execute based at least in part on the selection of the digital card, wherein the tertiary application comprises an interface application provided by the intermediate entity; and
        send, to the tertiary application, the identifier and the status information so that the tertiary application causes a second transaction between the sending entity and the receiving entity to occur based at least in part on the identifier and the status information, where the second transaction is executed as at least partially as a repeat of the first transaction facilitated by the intermediate entity.

6. The system for coordinating data with a mobile wallet application of claim 5, wherein:
    the providing at least the portion of the status information to the secondary application occurs in response to receipt of the status information.

7. The system for coordinating data with a mobile wallet application of claim 5, wherein:
    the providing at least the portion of the status information to the secondary application occurs in response to a request from the secondary application.

8. The system for coordinating data with a mobile wallet application of claim 5, wherein the secondary application comprises:

at least some portion of an operating system of a mobile device.

9. A non-transitory, machine-readable medium having instructions stored thereon for coordinating data with a mobile wallet application, wherein the instructions are executable by one or more processors to at least:

generate an identifier based on a first transaction between a sending entity and a receiving entity facilitated by an intermediate entity, wherein the identifier comprises a unique identifier that is specific to the first transaction;

receive an instruction comprising the identifier to add a digital card to a digital wallet from a tertiary application, wherein the instruction includes an identifier of a first transaction between a sending entity and a receiving entity facilitated by an intermediate entity, where the digital card is mapped to the first transaction between the sending entity and the receiving entity;

receive, from the intermediate entity, status information associated with the digital card, wherein the status information includes information associated with the first transaction including an indication of the sending entity and the receiving entity;

provide at least a portion of the status information to a secondary application;

cause, based at least in part on the portion of the status information received by the secondary application, the secondary application to display one or more alerts associated with the digital card, where the one or more alerts correspond to interactive elements that allow user interaction to cause the digital card or a tertiary application to be executed and information regarding the first transaction to be presented;

receive, via a selection of the displayed one or more alerts associated with the digital card, a selection of the digital card;

consequent to the selection of the displayed one or more alerts, cause the tertiary application that corresponds to a mobile application on a mobile device to execute based at least in part on the selection of the digital card, wherein the tertiary application comprises an interface application provided by the intermediate entity; and send, to the tertiary application, the identifier and the status information so that the tertiary application causes a second transaction between the sending entity and the receiving entity to occur based at least in part on the identifier and the status information, where the second transaction is executed as at least partially as a repeat of the first transaction facilitated by the intermediate entity.

10. The non-transitory, machine-readable medium of claim 9, wherein:

the providing at least the portion of the status information to the secondary application occurs in response to receipt of the status information.

11. The non-transitory, machine-readable medium of claim 9, wherein:

the providing at least the portion of the status information to the secondary application occurs in response to a request from the secondary application.

12. The non-transitory, machine-readable medium of claim 9, wherein the secondary application comprises:

at least some portion of an operating system of a mobile device.

* * * * *